UNITED STATES PATENT OFFICE.

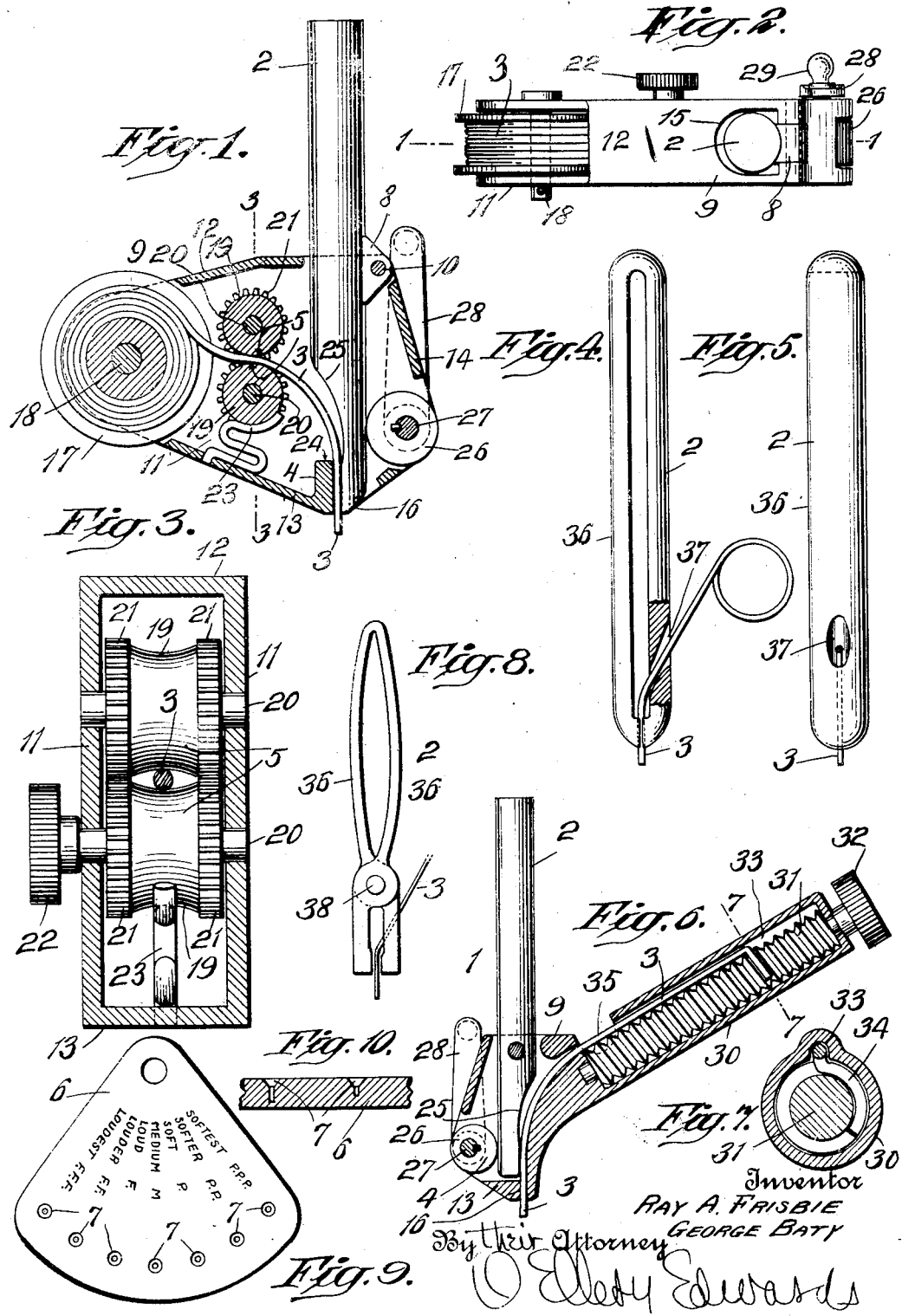

RAY A. FRISBIE AND GEORGE BATY, OF BROOKLYN, NEW YORK.

STYLUS OR NEEDLE FOR PHONOGRAPHS AND MEANS FOR REGULATING THE SAME.

1,367,956.  Specification of Letters Patent.  Patented Feb. 8, 1921.

Application filed January 8, 1920. Serial No. 350,164.

*To all whom it may concern:*

Be it known that we, RAY A. FRISBIE, a citizen of the United States, residing in the city of Brooklyn, county of Kings, and State of New York, and GEORGE BATY, a subject of the King of Great Britain, also residing in the city of Brooklyn, county of Kings, and State of New York, have invented a new and useful Improvement in Styli or Needles for Phonographs and Means for Regulating the Same, of which the following is a specification.

The object of our invention is to provide a device of this class in which a wire may be fitted an exact and predetermined distance in the needle so as to reproduce the sound recorded in the instrument where the device is used, and a further object is to provide a needle which may be fitted in any instrument.

These and other objects are accomplished by our invention, some embodiments of which are hereinafter more particularly set forth.

For more detailed description of our invention, reference is to be had to the accompanying drawings, forming a part hereof, in which—

Figures 1, 2 and 3 illustrate one embodiment, Fig. 1 being a sectional view taken on the line 1—1 of Fig. 2, and Fig. 3 is a sectional view taken on the line 3—3 of Fig. 1, and Fig. 2 is a plan view of this form of needle.

Figs. 4 and 5 show another form of needle, these two views being side elevations taken at right angles to each other.

Figs. 6 and 7 show yet a further modification, Fig. 6 being partially in section, and Fig. 7 being a sectional view taken on the line 7—7 of Fig. 6.

Fig. 8 is a side elevation of yet a further modification and shows a needle embodying our invention.

Figs. 9 and 10 show an adjusting device, Fig. 10 being a sectional view showing two adjusting holes and the part of the device adjacent thereto.

Throughout the various views of the drawings, similar reference characters designate similar parts.

Our improved needle 1 is provided with a shank 2 which is adapted to fit the needle holder of any phonograph, and a wire 3 which is held in a clamping device 4 which may be provided with a feeding device 5 or this device may be omitted. It is a great convenience because fine adjustments are possible where it is employed and such are possible where a gage 6 is provided with holes 7 of a depth corresponding to the exposed length of wire 3. This length will be longest for the softest or pianopianissimo notes and shortest for loudest or fortifortissimo notes, with intermediate holes as indicated, for pianissimo, piano, mezzo, forte and fortissimo notes, all as indicated in Figs. 9 and 10. This gage 6 is used by placing it where the wire 3 may be run into its appropriate hole 7 according to the indications on the gage and the results desired.

In the embodiment of our invention shown in Figs. 1, 2 and 3 the shank 2 is provided with a lug 8 on which is pivoted a frame 9 by means of a pin 10 and this frame 9 is provided with sides 11, a top 12, a bottom 13 and an end 14 all of which unite the sides 11, as indicated. The top 12 is provided with a hole 15 through which the shank 2 extends and the bottom 13 with a hole 16 through which passes the wire 3. This wire is mounted on a spool 17 which is between the sides 11 and on the pin 18 which connects them. From the spool 17 the wire 3 passes to the feed rollers 19 mounted on pivots 20 and placed between the sides 11 as shown. The feed rollers 19 are provided with integral gears 21 which mesh and one of the pivots 20 is extended to form a handle 22 by which the rolls 19 may be driven. A weak spring 23 rises from the bottom 13 and presses against the lower roller 19 to prevent any turning of these rollers without a positive drive.

The wire 3 passes from the rollers 19 to the clamping device 4, which in this embodiment of our invention, is composed of an extension 24 rising upwardly from the bottom 13 and on one side of the hole 16 and opposite the lower end of the shank 2 which is cut away to form a flattened surface 25 for the purpose. The wire 3 is clamped between these parts by means of an eccentric 26 which presses on the lower end of the shank 2 and opposite the surface 25 and is mounted on a shaft 24, to which it is fixed by a key or in any other suitable manner, and this shaft is journaled in the sides 11 and extends beyond one of them to receive a crank 28 which is also fixed thereon and provided at its free end with a handle 29 by which it may be thrown so as to remove the eccentric 26 from the shank 2 or to force the same against this shank, as desired, depending on whether the wire 3 is to be unclamped or clamped.

In view of the foregoing it is obvious that in this embodiment of our inventon the wire 3 may be unclamped, fed the right amount as indicated by the plate 6 and then clamped. It is fed by turning the handle 22.

In the embodiment of our invention shown in Figs. 6 and 7 the structure is the same except that the wire feed 5 is different. Here the casing 9 is provided with a cylindrical extension 30 which branches off diagonally and upwardly and it is hollow to receive a screw 31 which is journaled therein and provided with a disk 32 by which it may be turned. The extension 30 is slotted at the upper part of its opening, as indicated at 33 to receive the wire 3 which, in this case, has its extreme end bent at 34, to engage the screw 31. A suitable recess 35 is left at the end of the slot 33 which is near the shank 2 for the insertion of this wire. It is obvious that this wire 3 is adjusted in this embodiment of our invention when the clamp 4 is released and when in proper adjustment this clamp is tightened, as above described.

In the embodiment of our invention shown in Figs. 4 and 5, a much simpler construction is employed. Here an ordinary bar 36 is bent upon itself to form the shank 2, as indicated, and its lower ends are slightly recessed to receive the wire 3 which passes through an opening 37 at one side. Here a very short wire is used without the means for adjustment. This wire 3 is clamped between the ends of the bar 36 when the shank 2 of the needle 1 is inserted in the needle holder and the needle secured in the usual manner.

In Fig. 8 the same idea of means is employed except that the arms 36 are crossed and united by a pivot 38 so that when the needle is inserted in the needle holder the wire 3 will be clamped, as is obvious.

All embodiments of our invention, as above described, can be adjusted for the music to be rendered by means of the plate 6, as above described, except that it is easier to adjust the embodiments shown in Figs. 1 and 6 than it is to adjust the other embodiments, because the wire 3 may be fed with more exactness.

While we have shown and described several embodiments of our invention, it is obvious that it is not restricted thereto, but is broad enough to cover all structures that come within the scope of the annexed claims.

What we claim is:

1. A needle with a shank adapted to be secured in the needle holder of a phonograph, a frame pivotally mounted on said shank, a wire mounted in said frame and means in said frame for clamping the wire between the frame and the shank.

2. A needle with a shank adapted to be engaged by the needle holder of an ordinary phonograph, a frame pivotally mounted on said shank, a wire mounted on one side of said shank and in said frame and passing between said frame and said shank, an eccentric mounted in said frame and engaging said shank on the side opposite said wire and means for throwing said eccentric so that the wire may be clamped or unclamped between the frame and the shank according to the way in which the eccentric is thrown.

3. A needle with a shank adapted to be secured in the ordinary needle holder of a phonograph, a frame pivotally mounted on said shank, a spool carrying a wire mounted in said frame, feed rollers also mounted in said frame and between which said wire passes, means for driving said feed rollers so as to force them to feed the wire and means for clamping or unclamping the wire between the frame and shank whereby the extended end of the wire may be held in any desired position.

RAY A. FRISBIE.
GEORGE BATY.